United States Patent

[11] 3,579,062

| | | |
|---|---|---|
| [72] | Inventor | Thomas G. Chapman<br>Hudson Falls, N.Y. |
| [21] | Appl. No. | 880,533 |
| [22] | Filed | Nov. 28, 1969 |
| [45] | Patented | May 18, 1971 |
| [73] | Assignee | General Electric Company |

[54] ELECTRICAL CAPACITOR WITH THERMAL FUSE
11 Claims, 4 Drawing Figs.

[52] U.S. Cl. .......................................... 317/247, 317/256
[51] Int. Cl. .......................................... H01g 1/11
[50] Field of Search ............................ 317/12, 247, 256

[56] References Cited
UNITED STATES PATENTS
3,178,622  4/1965  Paul ........................... 317/256

*Primary Examiner*—E. A. Goldberg
*Attorneys*—Nathan J. Cornfeld, James J. Lichiello, Frank L. Neuhauser, Oscar B. Waddell and Joseph B. Forman ABSTRACT: A thermal fuse for a roll capacitor is disclosed wherein a wire lead is joined to a flag of aluminum which is sandwiched between two pieces of insulating material. A narrow strip of a thermal fusible alloy overlies the flag in the sandwich and extends therefrom. This sandwich is positioned in a capacitor roll between a dielectric strip and a foil strip so that the extending fusible alloy strip lies adjacent the capacitor foil strip for electrical connection thereto.

Patented May 18, 1971

3,579,062

INVENTOR:
THOMAS G. CHAPMAN,
BY James J. Vichiello
HIS ATTORNEY.

3,579,062

ELECTRICAL CAPACITOR WITH THERMAL FUSE

ELECTRICAL CAPACITOR WITH THERMAL FUSE

BACKGROUND OF THE INVENTION

1. Field of the Invention

This invention relates to a roll type electrical capacitor incorporating a thermal fuse, and more particularly, to a flag tap thermal fuse embodying a fuse element which is the only connecting element between the flag and a capacitor electrode.

2. Description of the Prior Art

A typical example of a thermal fuse for a roll type electrical capacitor is illustrated and described in U.S. Pat. No. 3,178,622 Paul et al., assigned to the same assignee as the present invention. In the noted patent, a capacitor lead is joined to a strip or flag of a fusible alloy material, and the flag bridges a gap between the separated ends of a capacitor electrode strip. Upon overheating of the capacitor, the fusible alloy strip melts thus breaking the electrical connection between the two ends of the capacitor electrode foil.

In the kind of thermal fuse arrangement as described, the capacitor lead is joined to the flag by welding, for example, to insure a good electrical connection. Welding of a wire lead, which may be for example a tinned copper or an aluminum strip, is difficult because of the low melting temperature of the thermal fuse strip. Other forms of welding, such as for example ultrasonic welding, are also difficult because of the softness and low melting point of the thermal fuse strip. In addition, a considerable degree of care is necessary in order to prevent a kind of resolidification of the fuse element, after melting, which would reestablish contact in the capacitor.

Roll capacitors are generally assembled by high speed automatic means and the flag tap arrangement of providing a lead contact to a capacitor foil is a desirable one. The use of a flag has been found to be a desired method of insuring adequate electrical connection from the lead to the capacitor electrode foil while at the same time lending inherent stability to the roll winding as well as the lead positioning and integrity within the capacitor roll.

It has been discovered that the advantages of a flag tap lead can be retained in a capacitor roll while at the same time employing a thermal fuse in cooperative relationship to the flag tap which obviates the difficulties, or improves the operation of prior thermal fuses.

SUMMARY OF THE INVENTION

Accordingly, it is an object of the invention to provide an improved flag tap thermal fuse for a roll capacitor.

It is another object of this invention to provide the combination of a flag tap and an additional fusible strip member cooperatively combined therewith to provide an electrical contact to a capacitor foil.

It is yet another object of this invention to provide a flag tap and a thermal fusible alloy strip combination which is sandwiched between insulating material strips so that the fusible alloy extends from the sandwich to make the only contact with a capacitor electrode foil strip.

These and other objects of this invention will be more apparent when taken in connection with the following description and the drawing in which:

In one preferred form of this invention, a wire lead is joined to a flag or strip of aluminum to provide a capacitor flag tap which is sandwiched between a pair of paper strips. A thermal fusible alloy strip overlies the flag in the sandwich and extends therefrom. This assembly is positioned in a capacitor roll section so that the sandwich is between a dielectric strip and a foil strip, and therefore the extending fusible alloy strip provides the sole electrical contact to the electrode foil strip. Upon overheating of the capacitor roll section, the fusible element melts and brakes the electrical connection over the edge of one of the paper strips.

DESCRIPTION OF THE PREFERRED EMBODIMENTS

Figure 1:
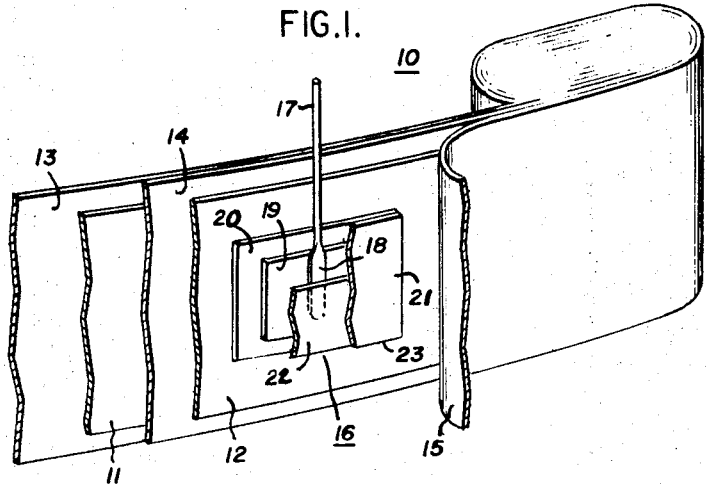
FIG. 1 is an illustration of one preferred embodiment of this invention where a fuse assembly is incorporated in a roll capacitor.

Referring now to FIG. 1, there is shown one preferred embodiment of this invention as a capacitor roll section 10. Capacitor roll section 10 includes a pair of spaced electrode foils 11 and 12 with an intermediate paper dielectric 13 between opposed side surfaces thereof. Inner, if desirable, and outer paper dielectric strips 14 and 15 respectively are positioned adjacent the other side surfaces of electrode foils 11 and 12 complete the composite which is wound in the convolute form as illustrated. In FIG. 1, the outer paper dielectric strip 15 is shown in a partially rolled back position to expose the fuse assembly 16 of this invention.

Fuse assembly 16 includes a wire or strip lead 17 having a flattened portion 18 on one end thereof. The flattened portion 18 is utilized to provide an expedient surface to weld the lead to a flag 19, which is usually of a thin aluminum strip thicker than the foil dielectric strips 11 and 12. The combination of the flag 19 and lead 17 is referred to as a flag tap. The flag 19 and the flattened part 18 of lead 17 are sandwiched between two pieces 20 and 21 of insulating material, usually paper, which overlie strip 19. Preferably, the strips 20 and 21 extend over the total area or periphery of flag 19 to prevent any electrical contact between flag 19 and the capacitor electrode foil 11. If desirable, the paper strips 20 and 21 may be of the same width as paper strips 13, 14 and 15. Ordinary capacitor grade, Kraft, paper of between 0.001- and 0.002-inch thickness has provided good results for paper strips 20 and 21.

The fusible element of this invention is illustrated as element 22 in FIG. 1. Element 22 comprises a long narrow strip of a fusible alloy material such as those Pat. disclosed in the aforementioned Paul Patent 3,178,622. For example, the strip may be various alloys of tin and zinc, tin and lead, and tin and copper, generally melting between about 175°—250° C. A thin strip of the fusible metal alloy 22 is employed to lie adjacent the flag 19 for good electrical contact therewith. Alloy strip 22 then overhangs or extends from the sandwich of paper strips 20 and 21 to provide an electrical contact with electrode strip 11 along a significant length thereof. In one practice of this invention, the fusible alloy strip was about 4.0-inches long with the paper strips 20 and 21 overlapping the fusible alloy strip about 0.25 inch.

In the operation of this device, when the capacitor roll temperature exceeds that of the melting temperature of the fusible alloy strip 22, the strip 22 melts and disperses to break the electrical connection between the flag 19 and the electrical strip 11. Examination of failed units indicates that the parting or dispersion of the fusible strip 20 occurs across the edge 23 of the paper strip 20. This edge 23 and the fold-over relationship of the strip 22 provide a substantial deterrent or barrier to any solidification of the melted portions of element 22 which would reestablish electrical contact with the foil 11.

The invention provides the distinct improvement in that a flag tap relationship of a wire lead 17 and a flag 19 is preserved for automatic high speed winding of the rolls, and automatic tap insertion. At the same time, the positive electrical connection is retained between the flattened section 18 of lead 17 and the flag 19. A further positive electrical connection is established by means of the large area contact of the fusible element 22 with the flag 19. This large area contact is also retained between the capacitor electrode strip 11 and the overlapping portion of the fusible element 22.

Various other materials may be employed in place of the paper strips 20 and 21. More particularly, other dielectric materials, such as some high temperature synthetic resins, particularly Mylar, may be substituted therefor. Combinations of synthetic resins and paper, such as Mylar and paper, may also be employed for each of insulating strips 20 and 21.

Figure 2:
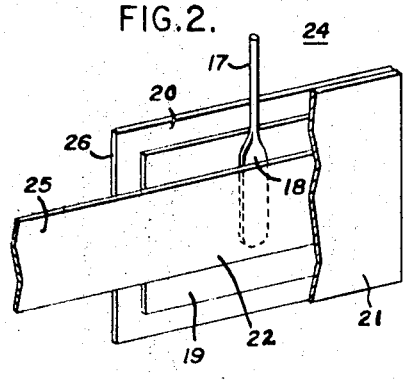
FIG. 2 is an illustration of a modification of the fuse assembly of FIG. 1.

A modification of this invention is illustrated in FIG. 2. Referring now to FIG. 2, the fuse assembly 24 comprises a sandwich of a pair of insulating material strips such as paper strips 20 and 21 with an intermediate flag tap arrangement of wire lead 17, flattened portion 18 and flag 19. This described sandwich is much the same as the described sandwich assembly 16 of FIG. 1. However, the fusible alloy strip 22 in this instance overlies the flag 19 and flattened section 18 in such a way that there is an exposed end 25 which projects from the sandwich structure in the horizontal direction, as opposed to the extension in the vertical direction as described with respect to FIG. 1. The arrangement as illustrated in FIG. 2 is inserted in a capacitor roll section between a dielectric strip and an adjacent capacitor electrode so that the paper strip 20 is adjacent the capacitor electrode. By this arrangement, and in the event of operation of the fuse device, the extending section 25 of the fusible element 22 which is in engagement with the capacitor foil, melts to interrupt the circuit to the capacitor through lead 17. At the time of melting, the section 25 is folded over the edge 26 of paper strip 20 and this discontinuity prevents, to a significant degree, the reconnection between any solidifying part of section 25 and the remainder of the fusible element 22 which does not overlie edge 26. As in FIG. 1, the paper strips 21 and 22 may be replaced with high temperature synthetic resin materials, for example Mylar, and particularly by composites of paper and synthetic resin materials. The synthetic resin materials are helpful in preventing migration of metal ions from the fusible element. In one embodiment of this invention, the strip 22 was about 0.001-inch thick, about 0.5-inch wide and 4.0-inches long. The paper strips 21 and 22 were both of Kraft paper of 0.002-inch thickness. The fusible alloy strip may be suitably joined to the flattened section 18 or to the flag 19 by welding, bonding or mechanical joining. However, it has not been found necessary to join the fusible strips to the flag in either of the embodiments shown in FIGS. 1 and 2.

In the embodiment shown in FIG. 1, it is preferable that the insulator strip 21 peripherally overlies or extends beyond the periphery of the flag 19. In the FIG. 2 embodiment, the fusible alloy strip 22 extends beyond one vertical edge 26 of the assembly. Accordingly, the insulator strip 21 does not have any critical dimensions nor do the dimensions thereof need to be identical with the dimensions of the insulator strip 20. It is preferable however to have strip 21 overlie the flag tap much in the same manner as insulator strip 21 overlies the flag 19 as in FIG. 1.

Figure 3:
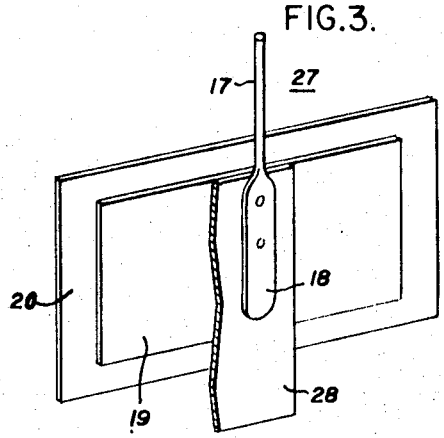
FIG. 3 is a further modification of the fuse assembly of FIG. 1.

A further modification of this invention is illustrated in FIG. 3. Referring now to FIG. 3, the is shown a fuse combination 27 including a tap strap 17, a flattened section 18, a thermal fusible strip 28 and a flag 19. In this arrangement, the flattened section 18 is joined to the flag 19 with the fusible strip 28 being therebetween. It has been found that by ultrasonic welding, the flattened section 18 is simultaneously joined to the fusible strip 28 and through fusible strip to flag 19. A backing paper strip 20 is employed so that when the section 27 is utilized in a capacitor roll, the paper 20 is adjacent the capacitor foil electrode. Therefore, the electrical connection is made to the capacitor foil electrode through tap strap 17, flattened section 18, and a vertical extending fusible section 28. The fusible section 28 makes a connection to the capacitor electrode foil over the edge 23 of the paper strip 20, and this edge 23 also prevents a reestablishment of electrical connection after fusing through solidification of the molten alloy material.

In each of the embodiments of FIGS. 1, 2 and 3, it is seen that the fuse arrangement of this invention may be employed where the flag tap kind of lead-in including a wire lead 17 and a flag 19 is employed. In addition to this desirable arrangement the fusible alloy section is arranged to make contact with a capacitor foil over an exposed edge or discontinuity of an insulating material to prevent reestablishment of an electrical circuit once broken through melting of the fusible section. The fuse section furthermore does not require the kind of split foil design as described with respect to the prior art.

Figure 4:
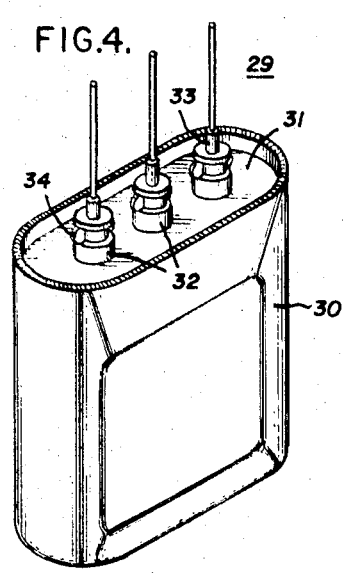
FIG. 4 is an illustration of an exemplary, impregnated sealed capacitor to which this invention is applicable.

Any one of the embodiments of FIGS. 1, 2 and 3 may be gainfully employed in the kind of capacitor illustrated in the prior art and particularly the kind as illustrated in FIG. 4. Referring now to FIG. 4, the capacitor 29 includes a metal can or casing 30 and a cover 31 sealed thereto. A roll section capacitor such as illustrated in FIG. 10 with two or more leads is positioned within the casing 30 so that it may be impregnated with a suitable impregnant such as a chlorinated diphenyl liquid impregnant. The leads 17 extend from the capacitor roll section through bushing seals 32 in the cover 31. These bushing seals include an elastomer material sleeve surrounding the lead wire 17 which is maintained in sealing engagement with wire lead 17 by means of a crimp 34 in the bushing 32.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

I claim:

1. In a roll section capacitor comprising in combination, a pair of spaced foil electrodes with an intermediate dielectric therebetween, and a further dielectric strip adjacent each electrode, a flag tap fuse assembly therefor comprising
   a. a flag tap including a lead conductor joined to a foil flag strip
   b. an insulator material strip adjacent said flag and overlying said flag peripherally
   c. a strip of a fusible alloy material, fusible between about 175°—250° C. and lying adjacent and in engagement with said flag with an extension thereof extending over at least one edge of said insulator strip
   d. said assembly being positioned adjacent a foil electrode in said roll section so that said extension overlies said insulator strip to electrically contact said foil electrode.

2. The invention as recited in claim 1 wherein said extension extends beyond a horizontal edge of said insulator strip.

3. The invention as recited in claim 1 wherein said extension extends beyond a vertical edge of said insulator strip.

4. The invention as recited in claim 1 wherein a further insulating strip is adjacent the other side of said flag and adjacent said fusible strip.

5. The invention as recited in claim 4 wherein said insulator strips are of a synthetic resin material.

6. The invention as recited in claim 5 wherein said insulator strips comprise a composite of a synthetic resin strip and a paper strip.

7. The invention as recited in claim 4 wherein said fuse assembly is positioned in a roll between a foil electrode and an adjacent dielectric strip.

8. The invention as recited in claim 4 wherein said fuse assembly is positioned between one of said electrode strips and said intermediate dielectric strip.

9. The invention as recited in claim 4 wherein said fusible strip is positioned along one horizontal edge of said flag to overlie a part of said flag and extend vertically over said insulator strip.

10. The invention as recited in claim 3 wherein said fusible strip is spaced within the longitudinal edges of said flag.

11. The invention as recited in claim 9 wherein said fusible section is joined to said flag tap.